Feb. 18, 1958 R. F. HARRINGTON 2,823,553
SPROCKET IDLER
Filed July 7, 1955
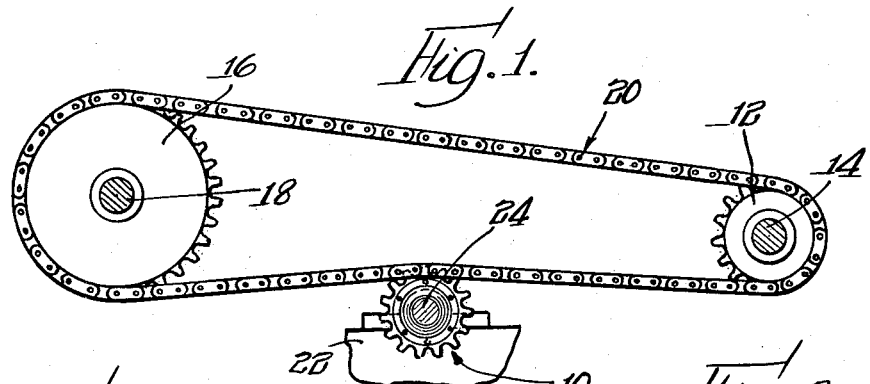
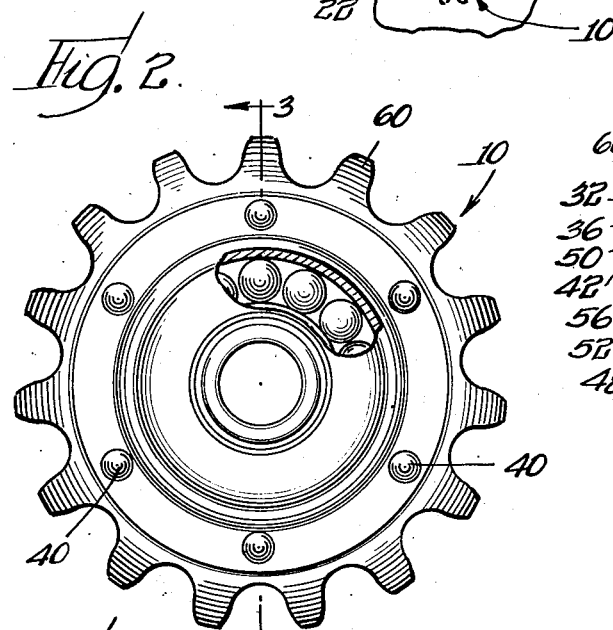
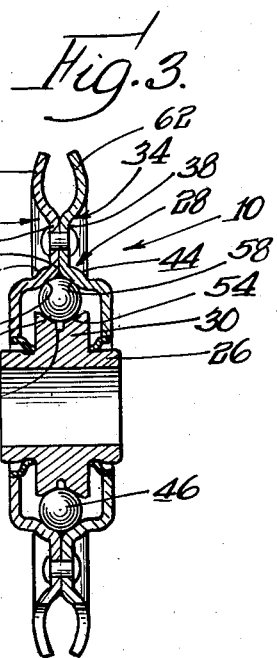
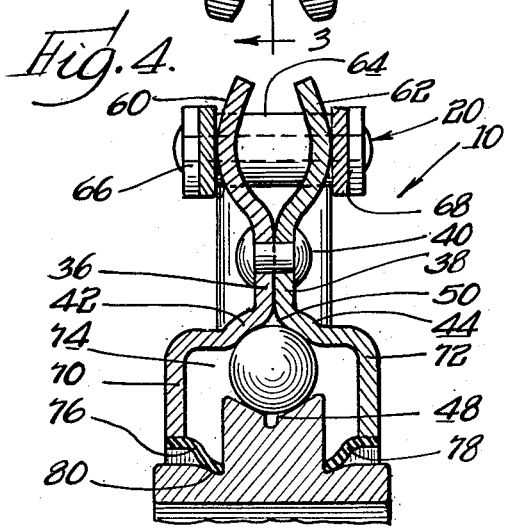
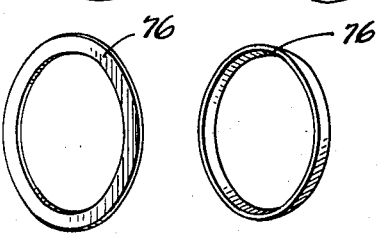
INVENTOR.
Richard F. Harrington
BY:
Oldson & Trexler
Attys.

United States Patent Office 2,823,553
Patented Feb. 18, 1958

2,823,553

SPROCKET IDLER

Richard F. Harrington, Davenport, Iowa, assignor to Parkersburg-Aetna Corporation, Chicago, Ill., a corporation of West Virginia Application July 7, 1955, Serial No. 520,462

7 Claims. (Cl. 74—243)

The present invention relates to a novel sprocket wheel, and more particularly to a novel sprocket idler.

Sprocket idlers have long been in use in various types of machinery for guiding sprocket chains, maintaining proper tension in the chains and other purposes, and such prior sprocket idlers have, in general, required the use of relatively complicated shaft and bearing means for the support thereof so that, in view of the present invention, they are relatively difficult and expensive to install and maintain.

An important object of the present invention is to provide a novel sprocket idler having anti-friction bearing means incorporated therein whereby the sprocket idler may be quickly and easily mounted and the need for special separate shaft and bearing means is eliminated.

A further object of the present invention is to provide a novel sprocket idler incorporating prelubricated, sealed, anti-friction bearing means whereby maintenance may be substantially reduced.

Another object of the present invention is to provide a novel sprocket idler of the type described in the preceding paragraph wherein a relatively large capacity lubricant chamber is provided for a given diameter of the sprocket whereby any need for relubrication is reduced or substantially eliminated.

Still another object of the present invention is to provide a novel sprocket idler of the above described type which is rigidly and ruggedly constructed and which may be economically manufactured.

A more specific object of the present invention is to provide a novel sprocket idler wherein the teeth are formed so as to minimize sprocket chain side bar friction whereby smoother and quieter operation is promoted.

Other objects and advantages of the present invention will become apparent from the following description and the accompanying drawings wherein:

Fig. 1 is a schematic view showing an installation including a sprocket idler embodying the principles of this invention;

Fig. 2 is an elevational view of the novel sprocket idler partially broken away to show a plurality of the anti-friction or ball bearings incorporated in the structure;

Fig. 3 is a cross sectional view taken along line 3—3 in Fig. 2;

Fig. 4 is an enlarged fragmentary cross sectional view more clearly showing a portion of the novel sprocket idler structure;

Fig. 5 is a perspective view showing an annular seal to be utilized in the novel sprocket structure; and Fig. 6 is a perspective view showing how the annular seal is twisted for assembly in the sprocket structure.

Referring now more specifically to the drawings wherein like parts are designated by the same numerals throughout the various figures, an installation utilizing an idler sprocket 10 embodying the principles of this invention is shown in Fig. 1. This installation which is shown by way of example only includes a driving sprocket 12 fixed on a drive shaft 14 and a driven sprocket 16 fixed on a shaft 18. An endless chain 20 of any known construction encircles the sprockets 12 and 16. The sprocket idler 10 is positioned for engaging the chain and maintaining the proper tension therein, and the sprocket idler may be readily mounted on a bracket or frame member 22 by means of a simple stub shaft or bolt 24. It is understood, of course, that the sprocket idler may be utilized in other types of installation for various other purposes.

As shown in Figs. 2, 3 and 4, a sprocket idler includes a hollow hub member 26 and annular disk means 28 surrounding the hub. An annular inner bearing race 30 encircles the hub member and preferably is formed integrally therewith. The bearing race 30 is substantially shorter than and is centrally located with respect to the hub member and has an outer diameter substantially greater than the outer diameter of the hub member for the purpose set forth below. The disk means 28 comprises a pair of complementary sheet metal disks 32 and 34 having abutting annular mid-portions 36 and 38 respectively which are rigidly secured together by a plurality of fastening devices such as rivets 40 or the like. Extending oppositely from the mid-portions 36 and 38 are complementary sections 42 and 44 which combine to provide an outer bearing race. The disk means is supported on the hub by a plurality of balls or anti-friction elements 46 confined between the arcuate surfaces of the outer bearing race and the inner race 30. An annular groove 48 is provided in the bearing surface of the inner race 30 and a similar groove 50 is provided between the bearing surfaces of the outer race sections 42 and 44. As a result, each ball contacts the races at four points indicated by the numerals 52, 54, 56 and 58 to provide more rigid support for the disk means.

The disk 32 is provided with a plurality of circumferentially spaced peripheral teeth 60, and the disk 34 is provided with a plurality of similar teeth 62. Each tooth 60 is paired and axially aligned with a tooth 62 so that the teeth of each pair simultaneously engage the chain. As shown in Figs. 3 and 4, each pair of teeth 60 and 62 flares from adjacent its roots oppositely with respect to each other and are continuously curved so that their tips converge toward each other but, preferably, terminate spaced from each other. As a result of this structure, the teeth of each pair are spaced axially from each other for engaging a roller 64 of the chain 20 at axially spaced points. Furthermore, it should be particularly noted that the curved outer surfaces of the teeth can only engage the side bars or links 66 and 68 of the chain with substantially line contact whereby friction between the teeth and the chain side bars is minimized and smoother and quieter operation is promoted.

The sprocket disks 32 and 34 are respectively provided with inner annular sections 70 and 72 which extend from the bearing race sections inwardly along opposite ends of the bearing race 30 to points adjacent to but spaced from the hub member 26. The sections 70 and 72 are formed so that they are spaced axially from the opposite ends of the bearing race 30 so as to provide a chamber 74 having a relatively large capacity for receiving a bearing lubricant. In order to prevent the lubricant from escaping from the chamber and also to prevent dust or other foreign material from entering the bearing chamber, a pair of seals 76 and 78 is provided between the hub member and the inner margins of the disk sections 70 and 72. As shown in Fig. 5, the seal 76 which is produced from an elastic rubber or synthetic rubber-like material initially is in the form of a flat ring. The inner diameter of this ring is less than the diameter of the hub member 26 and, more particularly, is less than the diameter of an annular seat or groove 80 formed in the hub member, and the outer diameter of the ring is greater than the inner diameter of the disk section 70. The seal 76 is assembled by first twisting it into a substantially cylindrical or frustoconical configuration as shown in Fig. 6 and stretching or enlarging its inner margin. Then the inner margin is slipped over the end of the hub member 26 and inserted into the groove or seat 80. The inherent elasticity of the seal material tends to return the inner margin of the seal to its original diameter so that the inner margin is drawn tightly against the seat 80. At the same time, the outer margin of the seal tends to return to its original diameter so that the outer margin is firmly urged against the iner edge of the disk section 70. The seal 78 is formed and assembled in the same manner as the seal 76. These seals may not only be easily and economically formed and assembled in the sprocket structure, but it has been found that they are long lasting and effectively prevent the lubricant from escaping from the chamber 74 or entry of foreign material into the chamber.

While the preferred embodiment of the present invention has been shown and described herein, it is obvious that many structural changes may be made without departing from the spirit and scope of the appended claims.

The invention is claimed as follows:

1. A sprocket idler comprising a hub member, an inner annular bearing race on said hub member, a pair of annular sheet material disks surrounding said hub member and having circumferentially spaced teeth thereon for cooperating with a sprocket chain or the like, said disks having abutting annular mid-portions, said teeth curving axially outwardly from said mid-portions and then back toward one another progressing radially outwardly from said mid-portions, securing means extending through said abutting portions and rigidly connecting the disks, said disks including complementary sections extending oppositely from inner margins of said abutting portions and providing an outer bearing race spaced from and radially aligned with the inner bearing race, said disks including inner annular wall sections extending from said bearing race sections inwardly along and spaced from opposite ends of the inner race for providing a lubricant chamber, means between said hub member and inner annular margins of said wall sections and resiliently gripping said hub member and resiliently pressing against said inner margins for sealing said chamber, and a plurality of anti-friction element means disposed between said inner and outer races.

2. A sprocket idler comprising a hub member, an inner annular bearing race on said hub member, a pair of annular sheet material disks surrounding said hub member and having abutting annular mid-portions, securing means extending through said abutting portions and rigidly connecting said disks, each of said disks including peripheral circumferentially spaced teeth, each tooth on each disk being paired with and radially aligned with a tooth on the other disk, the teeth of each pair being axially spaced from each other for engaging a sprocket chain at axially spaced points, said teeth being convex on the axially outer surfaces thereof and having a maximum axial spacing radially outwardly of said abutting portions, said disks including complementary sections extending from inner margins of said abutting portions and providing an outer bearing race spaced from and radially aligned with said inner bearing race, said disks including annular wall sections extending radially inwardly from said complementary sections and adjacent to said hub member for providing a lubricant chamber, a pair of seal rings respectively disposed between said hub member and inner annular margins of said wall sections, each of said seal rings normally having an inner diameter less than the diameter of said hub member and an outer diameter greater than the inner diameter of said wall sections, and a plurality of anti-friction elements disposed between said inner and outer races.

3. A sprocket idler comprising hub means, an annular inner bearing race on said hub means, a pair of rigidly connected annular sheet material disks surrounding said hub means, each of said disks including a plurality of peripheral circumferentially spaced teeth, each of said teeth being flared from adjacent its root laterally outwardly with respect to its associated disk and then curved inwardly so as to minimize frictional engagement with side bars of a sprocket chain or the like, said disks including complementary annular portions providing an outer bearing race spaced from and radially aligned with said inner bearing race, said disks including annular wall sections extending radially inwardly from said complementary portions and adjacent to said hub means for providing a lubricant chamber, a pair of seal rings respectively disposed between said hub means and inner annular margins of said wall sections, each of said seal rings normally having an inner diameter less than the diameter of said hub means and an outer diameter greater than the inner diameter of said wall sections for sealing the lubricant chamber, and a plurality of anti-friction elements disposed between said outer and inner races.

4. A sprocket idler comprising a hub member, an inner annular bearing race on said hub member, annular disk means surrounding said hub member and having a plurality of circumferentially spaced teeth for cooperating with a sprocket chain or the like, said disk means including a portion providing an outer bearing race spaced from and radially aligned with the inner bearing race, a plurality of anti-friction elements disposed between said inner and outer races, said disk means including a pair of axially spaced inner wall sections extending from said outer race along opposite ends of said inner race and adjacent to the hub member, and a pair of seal rings respectively disposed between said hub member and inner annular margins of said wall sections, each of said seal rings normally having an inner diameter less than the diameter of said hub member and an outer diameter greater than the inner diameter of said wall sections, whereby the seal rings snugly grip the hub member and resiliently press against the inner margins of the wall sections.

5. A sprocket idler comprising a hub member, an inner annular bearing race on said hub member, a pair of rigidly connected annular sheet material disks surrounding said hub member and having a plurality of circumferentially spaced teeth for cooperating with a sprocket chain, said disks including complementary annular oppositely extending sections providing an outer bearing race spaced from and radially aligned with the inner bearing race, a plurality of anti-friction elements disposed between said inner and outer races, said disks including inner annular wall sections extending inwardly from said bearing race sections along opposite ends of said inner bearing race for providing a lubricant chamber, means providing a pair of annular seats on said hub member respectively axially spaced inwardly of inner edges of said inner wall sections, and a pair of seal rings of elastic material having flattened radial cross sections, said seal rings having inner edges respectively disposed in said annular seats and normally having diameters less than the diameters of their associated annular seat, and said seal rings having outer marginal portions respectively engaging inner edges of said inner annular wall sections and normally having diameters greater than the diameters of said inner wall section edges.

6. A sprocket idler comprising a hub member, an annular inner bearing race on said hub member and having a bearing surface with a concave cross section, annular disk means surrounding said hub member and having a plurality of circumferentially spaced teeth cooperable with a sprocket chain or the like, said disk means including an annular outer bearing race spaced from and radially aligned with said inner bearing race and having a concave cross section, said disk means having substantially planar confronting sections intermediate said teeth and said outer bearing race, said disk means extending axially outwardly substantially at right angles to said confronting sections and then radially inwardly to form a lubricant chamber, said outer race comprising a concave section at the juncture of said confronting sections and the right angle extending portions, means between said hub member and innermost margins of said disk means and resiliently gripping the hub member and resiliently pressing against said innermost margins for sealing the lubricant chamber, and a plurality of ball elements disposed between and engaging said inner and outer races, said inner and outer races having generally centrally located annular grooves in the bearing surfaces thereof, each of said ball elements having four point contact with said races for rigidly supporting said disk means.

7. A sprocket idler comprising a hub member, an annular bearing race disposed on the hub member between opposite ends thereof and having an outer diameter substantially greater than the diameter of the hub member, said bearing race having a bearing surface with a concave cross section and an annular generally centrally located groove therein, a pair of sheet material annular disks surrounding said hub member and having annular abutting mid-portions, securing means extending through said abutting mid-portions and rigidly connecting said disks, each of said disks including a plurality of peripheral circumferentially spaced teeth, each of said teeth being curved laterally outwardly from its associated disk and then inwardly for minimizing frictional contact with side bars of a sprocket chain or the like, said disks including complementary annular oppositely extending curved sections providing an outer bearing race spaced from and radially aligned with said inner bearing race and having a bearing surface with a concave cross section, means providing an annular groove in said last mentioned bearing surface, a plurality of ball elements disposed between and engaging said inner and outer races with four point contacts, said disks including inner annular wall sections extending inwardly from said curved bearing sections along and spaced from opposite ends of said inner bearing race to points adjacent said hub member for providing a relatively large capacity lubricant chamber, and means between said hub member and inner margins of said inner wall sections for substantially sealing said lubricant chamber.

References Cited in the file of this patent
UNITED STATES PATENTS

| | | |
|---|---|---|
| 485,839 | Darling | Nov. 8, 1892 |
| 1,181,175 | Shapiro | May 2, 1916 |
| 2,032,059 | Knapp | Feb. 25, 1936 |
| 2,310,607 | Batesole | Feb. 9, 1943 |
| 2,349,281 | Kendall | May 23, 1944 |